(12) United States Patent
Kahn et al.

(10) Patent No.: US 7,647,195 B1
(45) Date of Patent: Jan. 12, 2010

(54) METHOD AND APPARATUS FOR A VIRTUAL ACCELEROMETER SYSTEM

(75) Inventors: Philippe Kahn, Aptos, CA (US); Arthur Kinsolving, Santa Cruz, CA (US)

(73) Assignee: DP Technologies, Inc., Scotts Valley, CA (US)

(*) Notice: Subject to any disclaimer, the term of this patent is extended or adjusted under 35 U.S.C. 154(b) by 222 days.

(21) Appl. No.: 11/776,535

(22) Filed: Jul. 11, 2007

Related U.S. Application Data

(60) Provisional application No. 60/830,204, filed on Jul. 11, 2006.

(51) Int. Cl.
G06F 9/455 (2006.01)
G06F 13/00 (2006.01)
G06F 19/00 (2006.01)

(52) U.S. Cl. ............... 702/141; 702/127; 702/187; 702/189; 719/310; 719/328; 719/329

(58) Field of Classification Search .......... 73/488, 73/489, 490, 491, 504.18, 510; 702/1, 127, 702/141, 155, 158, 160, 187, 189; 710/33; 719/310, 328, 329
See application file for complete search history.

(56) References Cited

U.S. PATENT DOCUMENTS

| | | | | |
|---|---|---|---|---|
| 4,646,255 A * | 2/1987 | Ebert et al. | ...................... | 703/8 |
| 5,021,982 A * | 6/1991 | Crosbie et al. | ................... | 703/8 |
| 5,819,206 A * | 10/1998 | Horton et al. | ................ | 702/150 |
| 5,854,843 A * | 12/1998 | Jacknin et al. | ............... | 381/309 |
| 6,020,956 A * | 2/2000 | Herman et al. | ........... | 356/139.01 |
| 6,216,131 B1 * | 4/2001 | Liu et al. | ..................... | 707/102 |
| 6,234,799 B1 * | 5/2001 | Lin | ................................ | 434/30 |
| 6,263,264 B1 * | 7/2001 | Herman et al. | .................. | 701/13 |
| 6,282,496 B1 * | 8/2001 | Chowdhary | .................. | 701/220 |
| 6,681,182 B2 * | 1/2004 | Heatwole et al. | ............. | 701/220 |
| 6,834,247 B2 * | 12/2004 | Hiedenstierna et al. | ........ | 702/85 |
| 6,975,959 B2 * | 12/2005 | Dietrich et al. | .............. | 702/153 |
| 7,353,112 B2 * | 4/2008 | Choi et al. | ................... | 701/220 |
| 7,409,289 B2 * | 8/2008 | Coatantiec et al. | ........... | 701/214 |
| 7,526,402 B2 * | 4/2009 | Tanenhaus et al. | ........... | 702/151 |
| 2001/0014890 A1 * | 8/2001 | Liu et al. | ..................... | 707/102 |
| 2003/0006671 A1 * | 1/2003 | Hiedenstierna et al. | ...... | 310/319 |
| 2003/0149529 A1 * | 8/2003 | Heatwole et al. | ............. | 701/220 |
| 2004/0107072 A1 * | 6/2004 | Dietrich et al. | .............. | 702/153 |
| 2004/0236500 A1 * | 11/2004 | Choi et al. | ................... | 701/200 |
| 2006/0007464 A1 * | 1/2006 | Percey | ........................ | 358/1.13 |
| 2006/0017692 A1 * | 1/2006 | Wehrenberg et al. | ......... | 345/156 |
| 2007/0032951 A1 * | 2/2007 | Tanenhaus et al. | ........... | 701/220 |
| 2007/0146312 A1 * | 6/2007 | Tsai et al. | .................... | 345/156 |
| 2007/0156338 A1 * | 7/2007 | Coatantiec et al. | ........... | 701/214 |
| 2007/0239399 A1 * | 10/2007 | Sheynblat et al. | ............ | 702/187 |

* cited by examiner

*Primary Examiner*—Edward R Cosimano
(74) *Attorney, Agent, or Firm*—Blakely, Sokoloff, Taylor & Zafman, LLP; Judith A. Szepesi

(57) ABSTRACT

A method and apparatus for a virtual accelerometer is described. The virtual accelerometer includes an active process identifier engine to identify any active application that may use accelerometer data. The virtual accelerometer also includes an intelligent signal interpretation and separation (ISIS) engine to separate raw accelerometer data for each of the active applications that use the accelerometer data. Additionally, the virtual accelerometer includes a universal application program interface (API) to provide separated accelerometer data to an application.

8 Claims, 7 Drawing Sheets

METHOD AND APPARATUS FOR A VIRTUAL ACCELEROMETER SYSTEM

RELATED CASES

The present application claims priority to U.S. Provisional Application Ser. No. 60/830,204, filed on Jul. 11, 2006, and incorporates that application in its entirety by reference.

FIELD OF THE INVENTION

The present invention relates to accelerometers, and more particular to creating a virtual accelerometer.

BACKGROUND

Accelerometers are becoming cheaper and more ubiquitous. Accelerometers are used in pedometers, to measure steps. Accelerometers are also used to identify human movements and translate them, for example for game controllers. Generally speaking, two two-dimensional accelerometers, or a three-dimensional accelerometer, are used in applications requiring the identification of motion in three dimensions. The accelerometer data identifies movement along the X, Y, and Z axis. Depending on the particular device in which the accelerometer is being used, the movement is translated into the appropriate data. For pedometers, this is step data. For game controllers this is cursor movement.

SUMMARY OF THE INVENTION

A method or apparatus for a virtual accelerometer is described. The virtual accelerometer is designed to utilize data from an accelerometer for multiple applications which may use the accelerometer data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
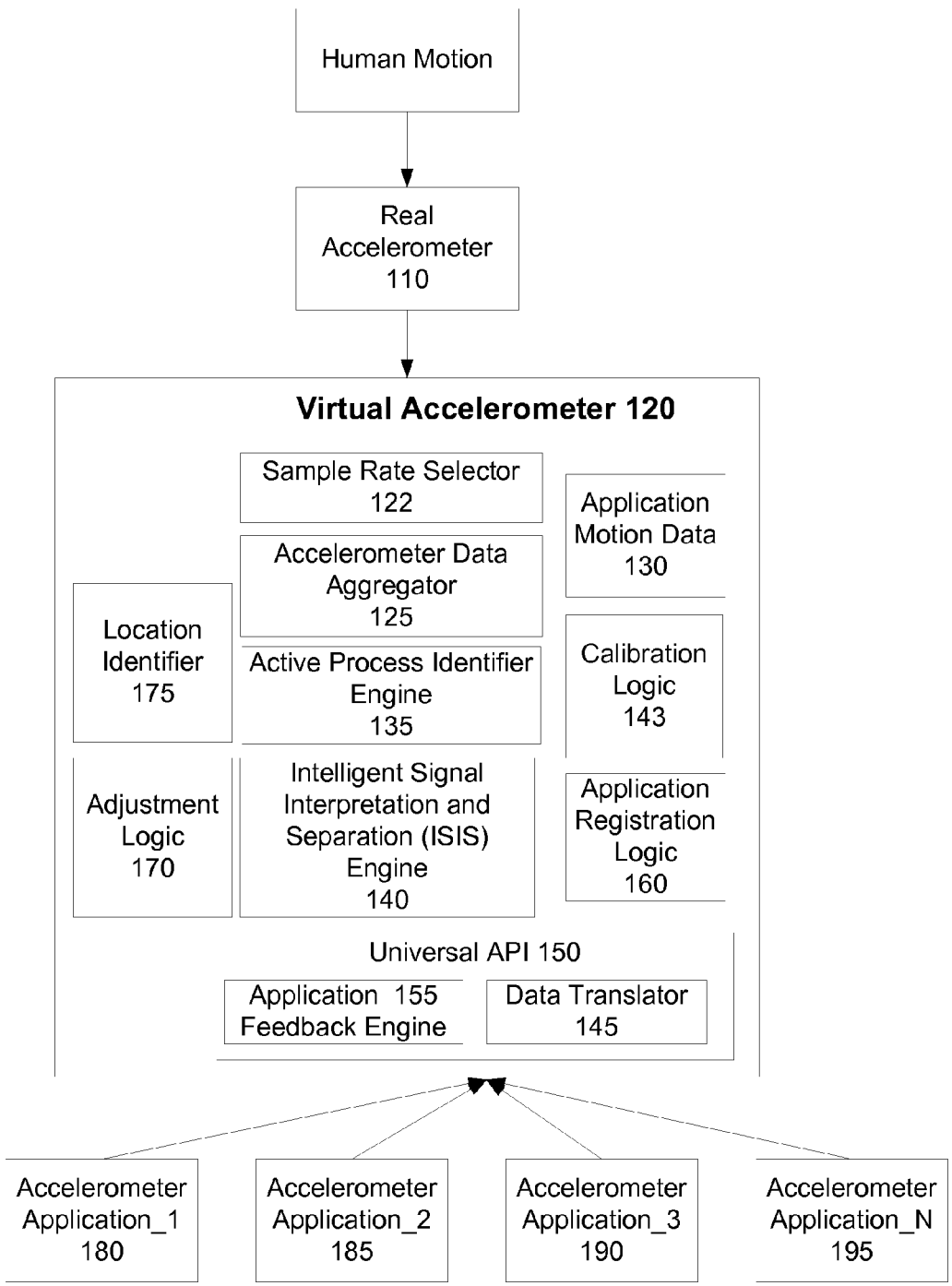
FIG. 1 is a block diagram of one embodiment of the virtual accelerometer.

The method and apparatus described is a virtual accelerometer that has one or more defined application program interfaces (APIs) and allows multiple applications to access or receive data from the same physical accelerometer. This enables multiple programs to receive accelerometer data without requiring that each application have its associated physical accelerometer. The virtual accelerometer receives the data from the real accelerometer and filters the output for each application that is waiting for accelerometer data. The applications need not be aware that there is a virtual accelerometer interposed between the real accelerometer and the application.

For example, the user may be playing a fishing game on a handheld device while walking. The handheld device may act as a pedometer, with the step data supplied from an accelerometer, while the fishing game may use the accelerometer data for game control. The accelerometer records the motions of the user, for the fishing game and the pedometer, as well as any extraneous motions. In one embodiment, the virtual accelerometer separates the data, such that only fishing game oriented data is passed to the fishing game application, and only step-oriented data is passed to the pedometer.

Whenever the real accelerometer is sampled, it provides a reading or over time one signal output which accounts for simultaneous data for all the applications running currently. The virtual accelerometer separates the accelerometer data based on awareness of which applications are running, and knowledge about the user's expected or possible motions while running that application. In one embodiment, the accelerometer is buffered, and the buffered data is analyzed and separated. However, since the sampling rate is quite fast generally, the separation occurs in pseudo-real-time, and does not appear significantly delayed to the user. The virtual accelerometer is able to separate that application's accelerometer signal from the accelerometer data. Regardless of the number of programs requesting accelerometer data at once, the virtual accelerometer separates out the relevant signals from the raw accelerometer data, and gives each application a signal equivalent to if that application were running on its own. In one embodiment, the same motion data may be sent to multiple applications for which it may be relevant. For example, a jump may provide motion input to a game, as well as step input for a pedometer.

In one embodiment, this is achieved by having the user run each application independently a first time. The virtual accelerometer analyzes the expected motions for each of the applications, and uses this knowledge, along with application state knowledge to identify the appropriate data for the application. In one embodiment, there is a set of common APIs so that each application gets nicely packaged motion data that is relevant to just that application. In another embodiment, certain applications may have associated "expected motion data" already available. For example, a pedometer application may be defined to expect step-motion data. Therefore, in one embodiment, the user need not initiate applications that have defined motion-types and ranges.

In one embodiment the virtual accelerometer modifies and/or turns off certain motion gestures, based on current activities. For example, in one embodiment, certain gesture recognition algorithms are adjusted or shut off entirely when the user is walking, jogging, or running above a certain cadence. In one embodiment, ambient noise levels are detected, and used to adjust the gesture recognition algorithms. In one embodiment, when a certain cadence is detected, the gesture library is changed to gestures appropriate for that cadence. In one embodiment, ambient noise data is input to the gesture recognition algorithms, and used to adjust them. This is useful because it permits the recognition of a gesture that is easy to do when a user is sitting holding the device, and yet does not get set off when the user is running. For example, tapping on a device may be used as a user interface command for controlling the mobile device or an application within the mobile device. When jogging or running, the mobile device may knock against the user's leg if in a short's pocket or on other objects in a handbag or other location. To solve this challenge, the gesture detection algorithm may be modified as the user's cadence increases so as not to be falsely triggered by the motions associated with the activity of the user.

FIG. 1 is a block diagram illustrating one embodiment of the virtual accelerometer. Human motion is the input to real accelerometer 110. The real accelerometer 110 produces an output. In one embodiment, there may be multiple real accelerometers 110. In one embodiment, the accelerometer is a 3-dimensional accelerometer.

In one embodiment, the virtual accelerometer 120 sets the sampling rate, via sample rate selector 122. In one embodiment, the sampling rate is set to above the sampling rate required by the most demanding active application. In one embodiment, the sample rate is set to satisfy the sampling frequency of each application. For example, there may be three applications are running A, B, and C, which require samples every 10 seconds, 7 seconds, and 3 seconds respectively. In one embodiment, the actual sampling rate may be 3 seconds. In another embodiment, the actual sampling rate may be 1 second, so that each of the applications gets its exactly timed samples. In another embodiment, since most applications will accept a range of sampling rates, the sampling rates of the applications are set to provide an optimized "combined" sample rate. For example, in the above example, the sampling rates for the three applications may be set to 3, 6, and 9, respectively. This enables the system to set a sampling rate of 3 seconds, providing better-than-minimum sample rate for each of the three applications, while reducing the actual sampling rate, and therefore the power consumption of the accelerometer.

The sampled raw accelerometer data is sent to the virtual accelerometer 120, at the sampling rate set by sample rate selector 122. The data is temporarily stored, in one embodiment, in accelerometer data aggregator 125.

Active process identifier engine 135 identifies all applications currently running which utilize accelerometer data. In one embodiment, if no active application utilizes accelerometer data, the virtual accelerometer 120 stops sampling the real accelerometer. In one embodiment, the virtual accelerometer 120 may send a signal to power down the real accelerometer during these times. In one embodiment, when an application utilizing accelerometer data is initiated, the virtual accelerometer wakes up the actual accelerometer.

If there are active applications, the accelerometer data, via aggregator 125, and active processes, as identified by active process identifier engine 135, are passed to the intelligent signal interpretation and separation (ISIS) engine 140. The ISIS engine 140 identifies the target application(s) for each motion component. The ISIS engine 140 passes the separate motion components to data translator 145, in universal API 150. Data translator 145 provides the data to the appropriate applications (180, 185, 190, 195), in the appropriate format for that application.

In one embodiment, adjustment logic 170 utilizes data from the active applications to determine if one or more of the applications' gesture sets should be turned off or modified. For example, it is unlikely that a user who is jogging at a good speed is also simultaneously playing a game of virtual ping-pong. Therefore, even if that game is active on the user's device, the adjustment logic 170 may stop feeding accelerometer data to the device. In one embodiment, there are certain activities that make other activities unlikely/impossible.

The adjustment logic 170 may turn off the accelerometer feed to those applications. This ensures that a user jogging doesn't accidentally provide data to an application which clearly is not compatible with jogging. In one embodiment, the cadence of movement defines which applications' feeds are halted or adjusted by adjustment logic 170. In one embodiment, during vigorous activity, adjustment logic 170 ensures that motions which may be part of the vigorous activity are not also passed to another, unrelated, application. ISIS engine 140 utilizes the aggregated accelerometer data to identify the target application for the data. In one embodiment, the adjustment logic 170 determines whether the identified gesture is currently available, i.e. has not be shut off. In one embodiment, the ISIS engine 140 also receives ambient noise data from adjustment logic 170. Ambient noise includes any jiggling, shaking, or other motion which is "background noise." In one embodiment, people have an ambient noise level under various conditions, such as walking, talking, and even breathing deeply. Ambient noise cannot be removed from the accelerometer data, but in one embodiment the ISIS engine 140 can modify the recognition algorithms, depending on ambient noise level.

In one embodiment, the ambient noise level is a variable that is input in the gesture detection algorithm and is used to scale the magnitude of the gesture, i.e. if there is a lot of ambient noise, then a relatively large (more pronounced gesture) is necessary than if the device very still. Similarly with the user's cadence when walking/jogging/running. The cadence is an input into the gesture recognition algorithms of the ISIS engine 140, and that input adjusts the gesture. In one embodiment, the cadence may change the gesture entirely, to a different gesture that's practical when running at that cadence.

In one embodiment, a device location identifier 175 can tell from the motion signature of walking or other regular motions where the device is located. In one embodiment, this data is used by ISIS engine 140 to modify the gesture algorithm based on the devices location.

In one embodiment, universal API 150 is used as an interface to the applications. The application feedback engine 155, in one embodiment, enables the application to use its standard interface to a real accelerometer 110 to make adjustments to the sampling rate, or any other aspect of the functioning of the virtual accelerometer.

Application registration logic 160 provides the ability to register new applications with the virtual accelerometer 120. When a new application is uploaded to the system it is registered. In one embodiment, the virtual accelerometer detects new applications which attempt to access the real accelerometer 110. It then uses application registration logic 160 to obtain data from the new application. In one embodiment, during registration the user runs the application alone, which enables the virtual accelerometer to calibrate to the motion components associated with the new application. The system stores the application motion data 130. In one embodiment, it is stored in a database. In one embodiment, intelligent applications which are aware of virtual accelerometer's function may provide this data. For example, a game application is aware of which motion combinations may be used within that game. The intelligent application may provide a set of motion components. In one embodiment, the application may further provide In one embodiment, the system further includes calibration logic 143. During calibration, the system optimizes the generic motion signature to this particular user. Then, when the user is playing a pitching game and walking, the system is able to recognize the throwing signal and separate it from the repetitive continuous signal from walking (walking too has unique acceleration identifiers). For example, the virtual accelerometer 120 can identify which is the vertical component of acceleration and this component has a characteristic shape unique to steps. Same applies for something like a punch of the arm, or the flick of the wrist. Due to human biomechanics, motions do not consist of one simple clean cut acceleration, but have unique identifiers which tag them as a particular acceleration pattern. For example, when a user throws something, the biceps, triceps and brachioradialis muscles each fire at points in the motion to achieve the net motion. This leads to small irregularities or discontinuities in the acceleration which amount to a signature that define that sequence of accelerations to be a throw and not a punch, flick of the wrist or a leg kick. It further identifies that particular user's characteristic form for such an action.

Figure 2:
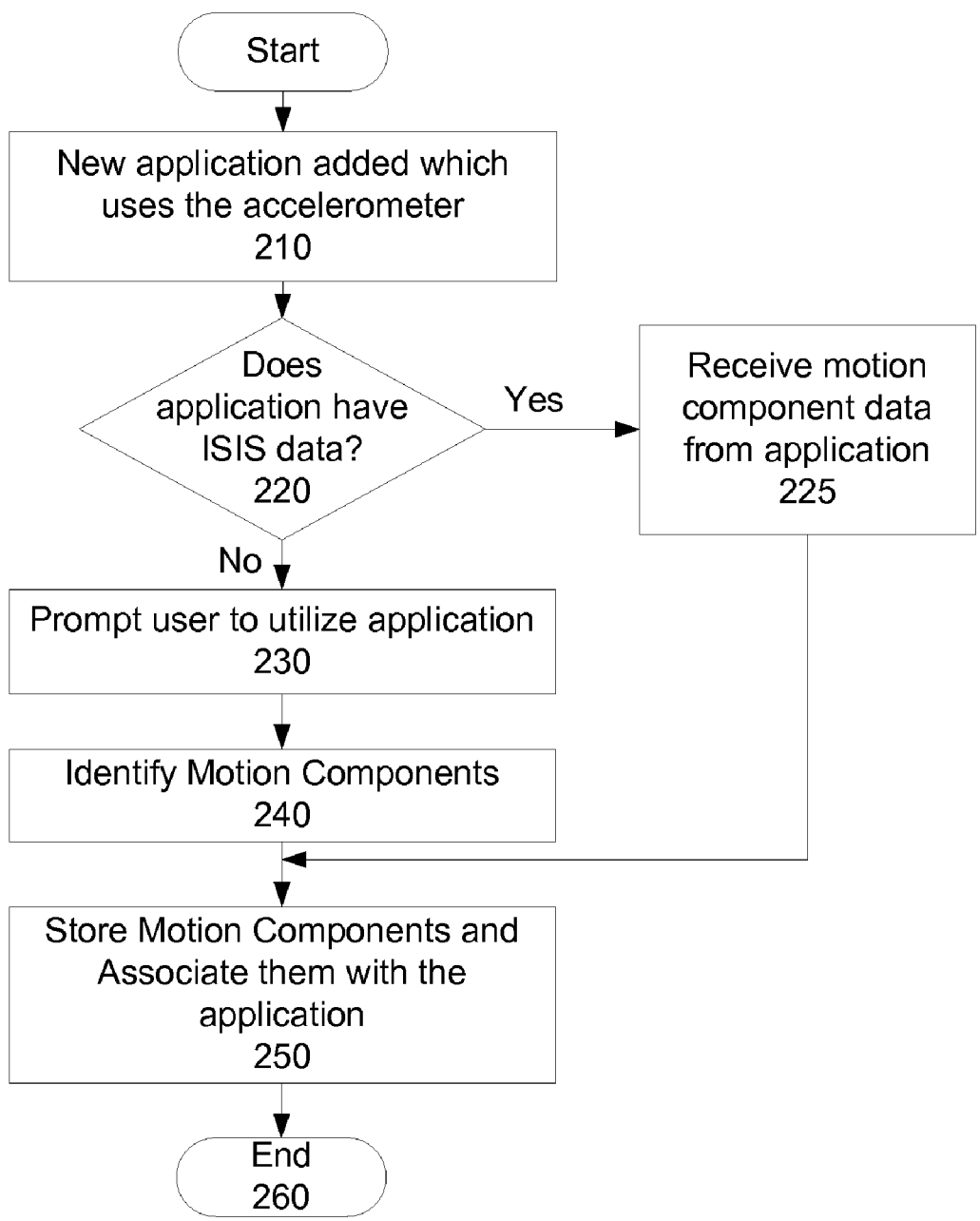
FIG. 2 is a flowchart of one embodiment of registering an application with the virtual accelerometer.

FIG. 2 is a flowchart of one embodiment of registering an application with the virtual accelerometer.

At block 210, a new application is added which uses accelerometer data. In one embodiment, this is detected by the virtual accelerometer, when the new application attempts to access the real accelerometer. In another embodiment, the user may identify the application as using accelerometer data. In another embodiment, there may be metadata associated with the application which identifies it in this way.

At block 220, the process determines whether the application has ISIS data. In one embodiment, certain applications may be designed to work with the virtual accelerometer. These applications, in one embodiment, provide their own motion component data, without requiring the user to register. This motion component data is referred to as ISIS data here.

If the application does not have ISIS data, at block 230, the user is prompted to utilize the application for registration. In one embodiment, the user is requested to not take any extraneous movements during this registration process. In one embodiment, the user is also requested to go through the full range of motions that may be used with the application.

At block 240, the motion components associated with each of the movements made by the user are identified.

At block 250, the motion components are associated with the application, and stored. In one embodiment, a "motion sequence" may also be created and associated with the application. For example, for a fishing game, the casting may include a sequence of motion components which generally occur in a row. The registration process then ends, at block 260.

If the application did have ISIS data, at block 220, the motion component data is obtained from the application at block 225. The data is then stored, at block 250, and the process ends.

Figure 3:
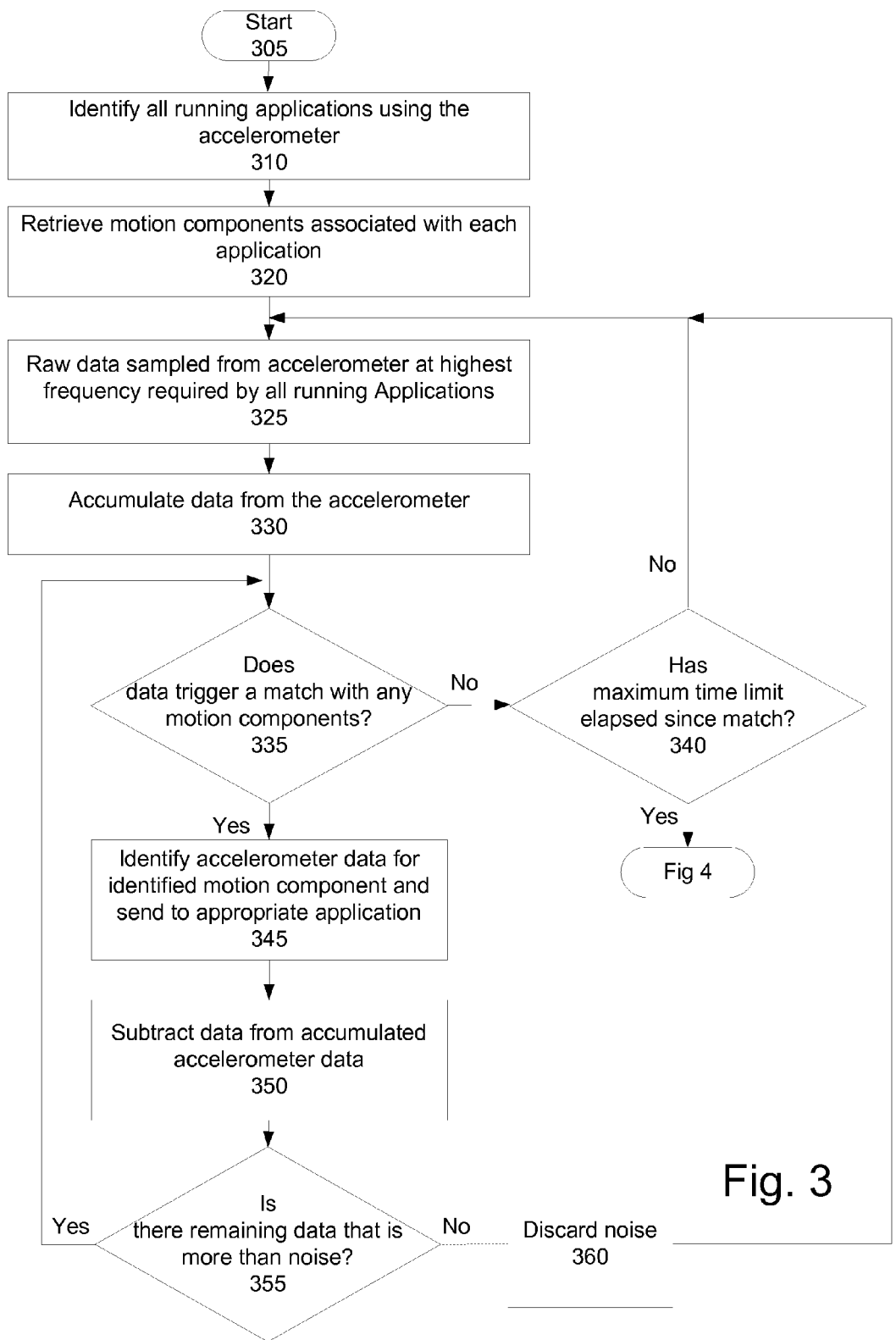
FIGS. 3, 4 and 5 are a flowchart of one embodiment of using the virtual accelerometer.
Figure 4:
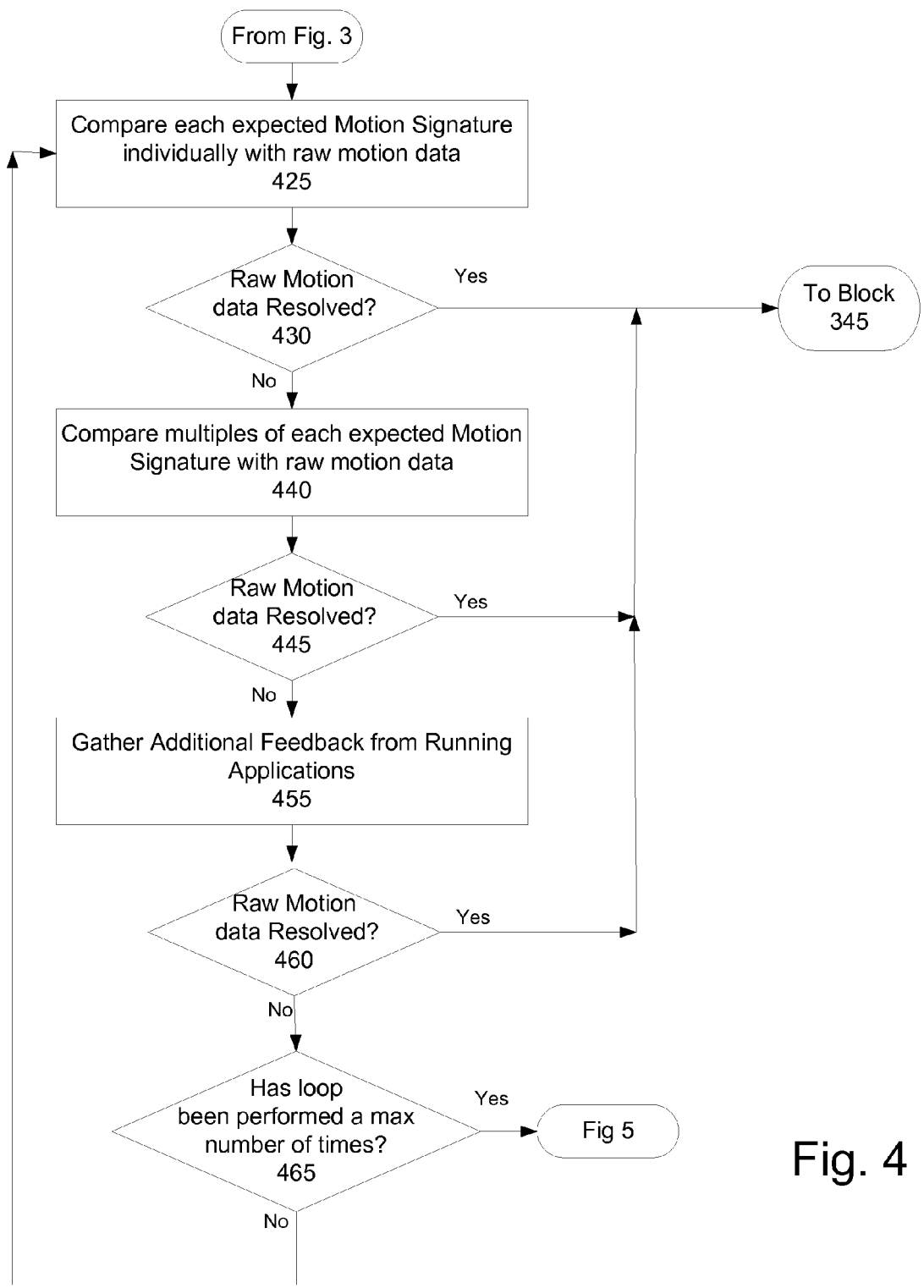
Figure 5:
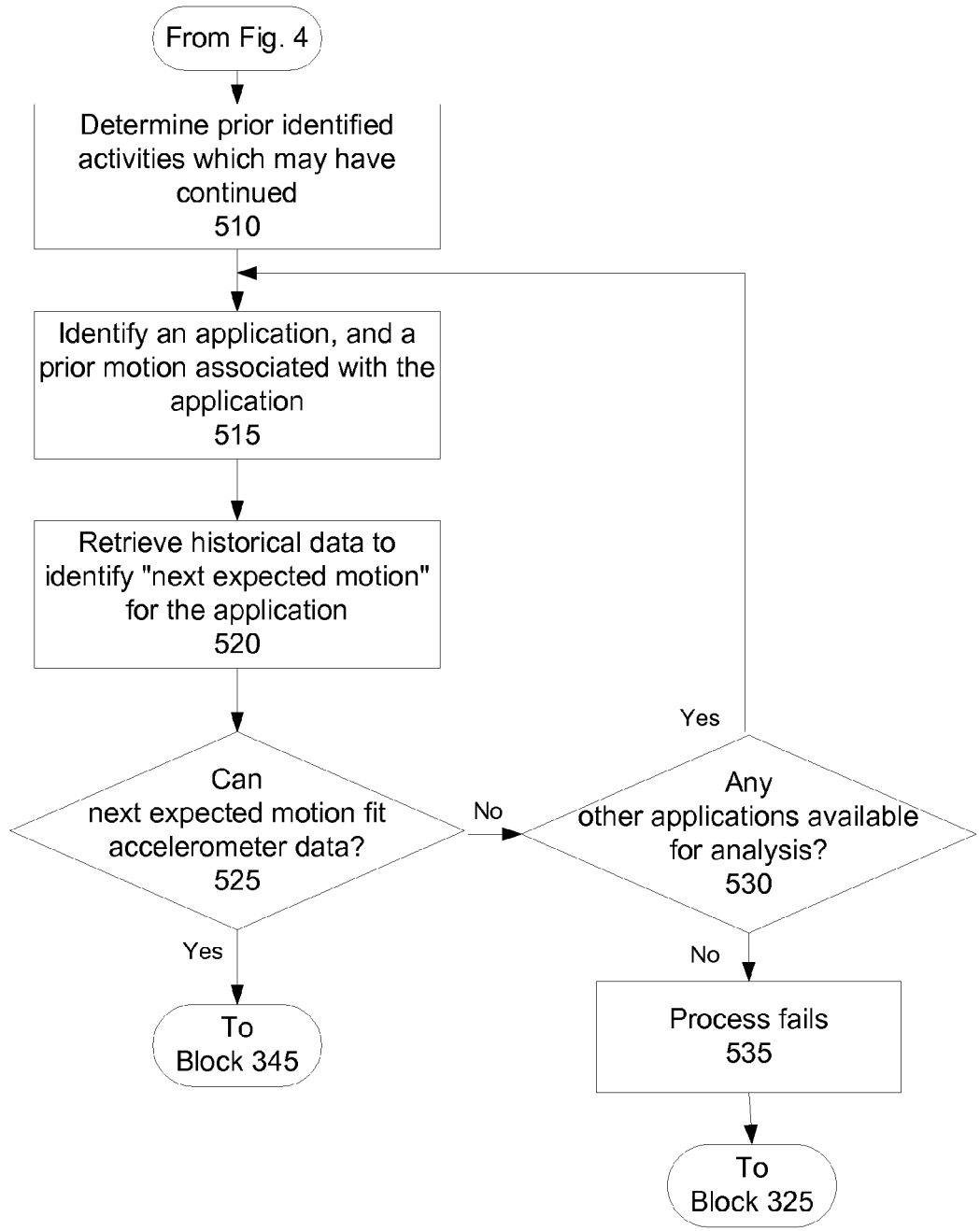

FIGS. 3, 4 and 5 are a flowchart of one embodiment of using the virtual accelerometer. The process starts at block 305. In one embodiment, the process starts when the device is activated. In one embodiment, the process starts when the accelerometer is activated.

At block 310, all of the currently active applications which user accelerometer data are identified. This may include one or more applications. In one embodiment, if no applications are active the real accelerometer is turned off.

At block 320, the motion components associated with each of the applications are retrieved. In one embodiment, the motion components are put in active memory. In one embodiment, the motion components are stored in remote storage, such as on a server. In that case, in one embodiment, the retrieval moves the motion component data into local memory.

At block 325, the system samples data from the accelerometer. In one embodiment, the sample rate is the highest frequency required by any of the applications. In another embodiment, the sample rate is higher than the highest frequency. In one embodiment, the sample rate is calculated to be able to provide accelerometer data at each of the sample frequencies for each of the applications. Thus, if one application requests data at every 25 milliseconds, while another requests data at every 10 milliseconds, the actual sample rate may be 5 milliseconds, to ensure that both applications receive data at their preferred sample rate.

At block 330, data from the accelerometer is accumulated.

At block 335, the ISIS engine determines whether the accumulated accelerometer data matches with any motion components for the active applications. If a motion component is matched, the process continues to block 345. At block 345, the accelerometer data corresponding to the identified motion component is identified and sent to the appropriate application. In one embodiment, the data is translated into the proper format for the application.

At block 350, the sent data is subtracted from the accumulated accelerometer data.

At block 355, the process determines whether the remaining data is more than noise. When the recognized motion component data is removed from the data set, noise may remain. The noise may be the result of various factors including imprecise measurement, vibration, minor non-motion component movements, etc. If the remaining data is only noise, the process at block 360 discards the noise data. The process then returns to block 325 to continue collecting data. If the remaining data is more than noise, the process continues to block 335 to attempt to match the remaining data with the motion components.

If at block 335 no motion components are matched, the process at block 340 determines if the maximum time limit for collecting data has elapsed. In one embodiment, the maximum time limit for data collection is set at a multiplier of the sample rate. In one embodiment, the maximum time limit for data collection is set at a multiplier of the longest motion component time. For example, if the longest motion component is 0.5 seconds, the maximum time limit may be 1 second, to ensure that at least 1 full motion component must have been captured during the period. If the maximum time limit has not yet elapsed, the process returns to block 325 to continue accumulating data. Note that regardless of what processing steps are being taken, the data sampling and accumulation continues throughout the process. If the maximum time limit has elapsed, the process continues to FIG. 4.

At block 425, the process compares each possible motion signature individually with the raw accelerometer data that has been accumulated.

At block 430, the process determines whether the raw accelerometer data has now been resolved. If so, the process continues to block 345 of FIG. 3. If the raw motion data is not resolved, the process continues to block 440.

At block 440, multiples of each motion signature are compared to the data, and again the system determines whether the raw motion data has been resolved at block 445. If it has, the process continues to block 345. If not, the process continues to block 455.

At block 455, additional feedback is gathered from running applications. In one embodiment, for any raw application that are capable of providing such data, the process obtains "likely motion" data, or any other data that is available. At block 460, the process again queries whether the motion data was resolved. If so, the process continues to block 345.

If not, the process, at block 465 determines whether this sequence has been performed a set number of times. If not, the process returns to block 425. If the loop has been performed a set number of times, the process continues to FIG. 5.

At block 510, the system identifies previous activities which may have continued. At block 515, the application with which the previous activity was associated, and the prior motion are identified. For example, if the user has been playing a particular game, it is likely that the user has continued to play the game.

At block 520, historical data is retrieved to identify a "likely next motion" for the application. In one embodiment, entire motion component chains are stored by the system. Thus, the system may, in one embodiment, utilize the previous historical motions for this application to identify a likely next motion component. For example, in a fishing game, the selection of a lure is usually followed by the casting of the fishing rod.

At block 525, the process determines whether the next expected motion can fit the accelerometer data. If so, the process continues to block 345, to send the identified data to the appropriate application.

If the motion does not fit, the process continues to block 530. At block 530, the process determines whether any other applications are available for analysis. If so, the process returns to block 515, to continue processing. Otherwise, the identification process fails, at block 535. In one embodiment, the failed data set is discarded from the accumulated accelerometer data. In one embodiment, data is only discarded once sufficient time has elapsed that it is certain that it cannot be a partial motion which can be later identified. For example, if the maximum motion component length is 0.5 seconds, then data that is less than 2 seconds old is not discarded. In one embodiment, the failed data set is stored, as is all data, including the data subtracted from the accumulated accelerometer data at block 350. The process then continues to block 325, to continue accumulating new data.

Note that the above process may take place on a user's handheld device, on which the actual accelerometer is located. Alternatively, some or all of the functions of the virtual accelerometer may be performed on a server, base station, or remote device. The actual real accelerometer is located in a mobile device, generally worn or utilized by a user. However, the remaining processes may be split in any way between a processor on the mobile device and one or more servers.

Figure 6:
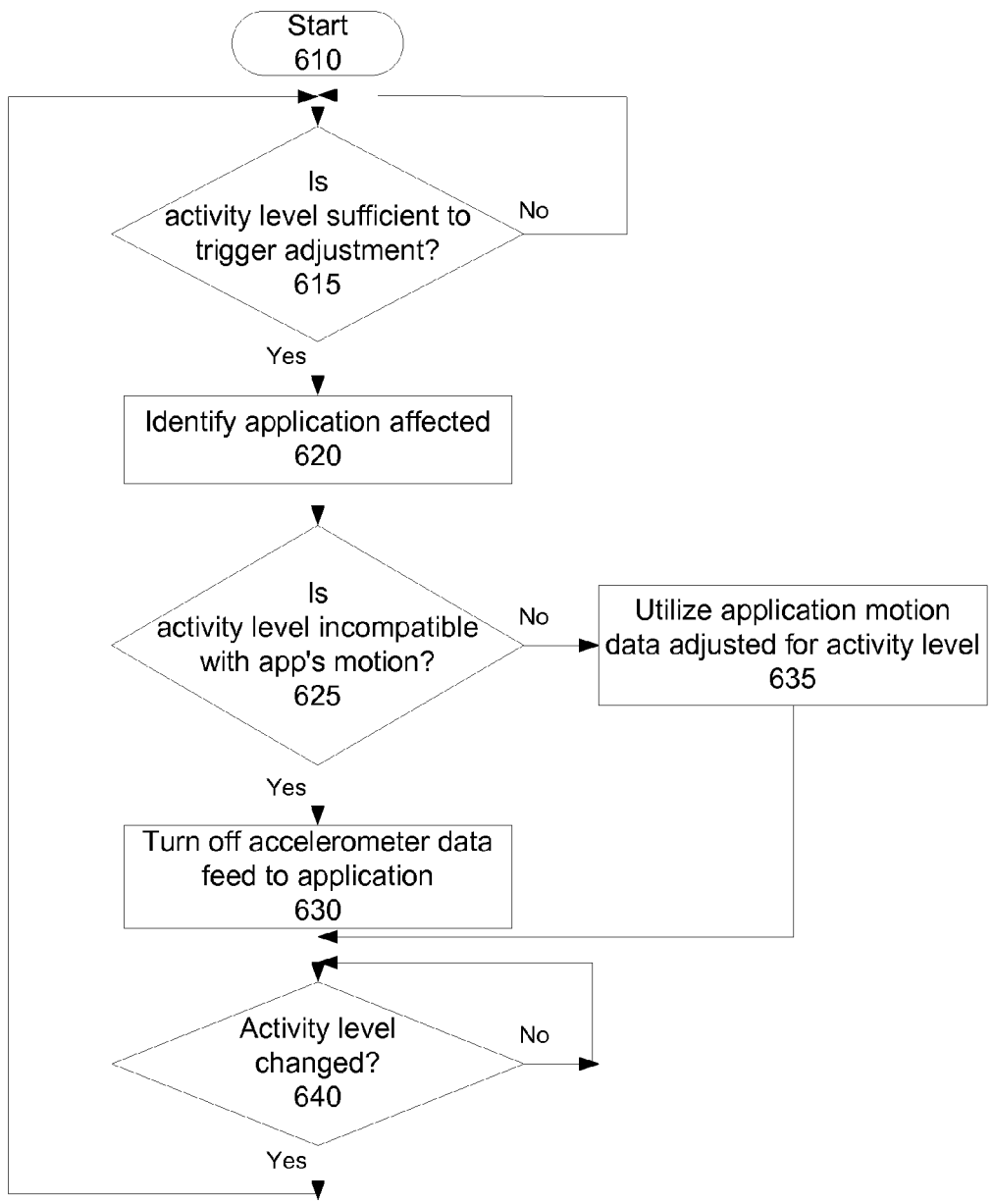
FIG. 6 is a flowchart of one embodiment of adjusting the virtual accelerometer based on current activity levels.

FIG. 6 is a flowchart of one embodiment of adjustments performed by the virtual accelerometer. The process starts at block 610. In one embodiment, this process is active whenever the virtual accelerometer is serving more than one application.

At block 615, the process determines whether an activity level is sufficient to trigger the adjustment. In one embodiment, activity above a certain cadence level triggers the adjustment. For example, jogging above 115 steps per minute may trigger an adjustment.

The process continues testing the activity level until it is sufficient to trigger the adjustment. Note that while this, and other processes, are shown in flowchart form, as is known in the art these tests may be done using interrupts or other trigger mechanisms that do not require testing, but rather simply activate the process when a particular activity threshold is reached.

When the activity threshold is reached, at block 620 the application affected is identified. In one embodiment, a separate thread is spawned for each application which is affected. In one embodiment, this process is sequentially performed for each application which is affected. In one embodiment, the process may have an associated trigger level which identifies all potentially affected applications which are then simultaneously processed.

At block 625, the process determines whether the activity level is incompatible with the application's motions. For example, while someone walking rapidly may make a telephone call, no one who is sprinting would be able to make a telephone call. Therefore, based on the user's activity level, certain motion interface features may be turned off, and certain applications may be kept from being activated.

If the activity level is incompatible with the application, the process at block 630 turns off the accelerometer data feed to the application. This means that the application would no longer receive accelerometer data. From the perspective of the application, the user is stationary. From the perspective of the user, the application becomes unavailable. The process then continues to block 640.

If the activity level is not completely incompatible with the application, at block 635, the motion data is adjusted. Generally speaking, when the user is highly active—for example jogging or bicycling, or similarly active, the motions performed by the user are less precise, broader, and faster than those performed by a stationary user. Therefore, in one embodiment, at block 635, the motion data is calibrated for the user at the activity level detected. In one embodiment, the calibration level may include two, three, or more levels ranging from stationary, through highly exertive activity.

The process then continues to block 640.

At block 640, the process determines whether the activity level has changed. If it has not, the process remains in place. If the activity level has changed, the process returns to block 615, to determine whether the new activity level requires an adjustment to the settings.

Figure 7:
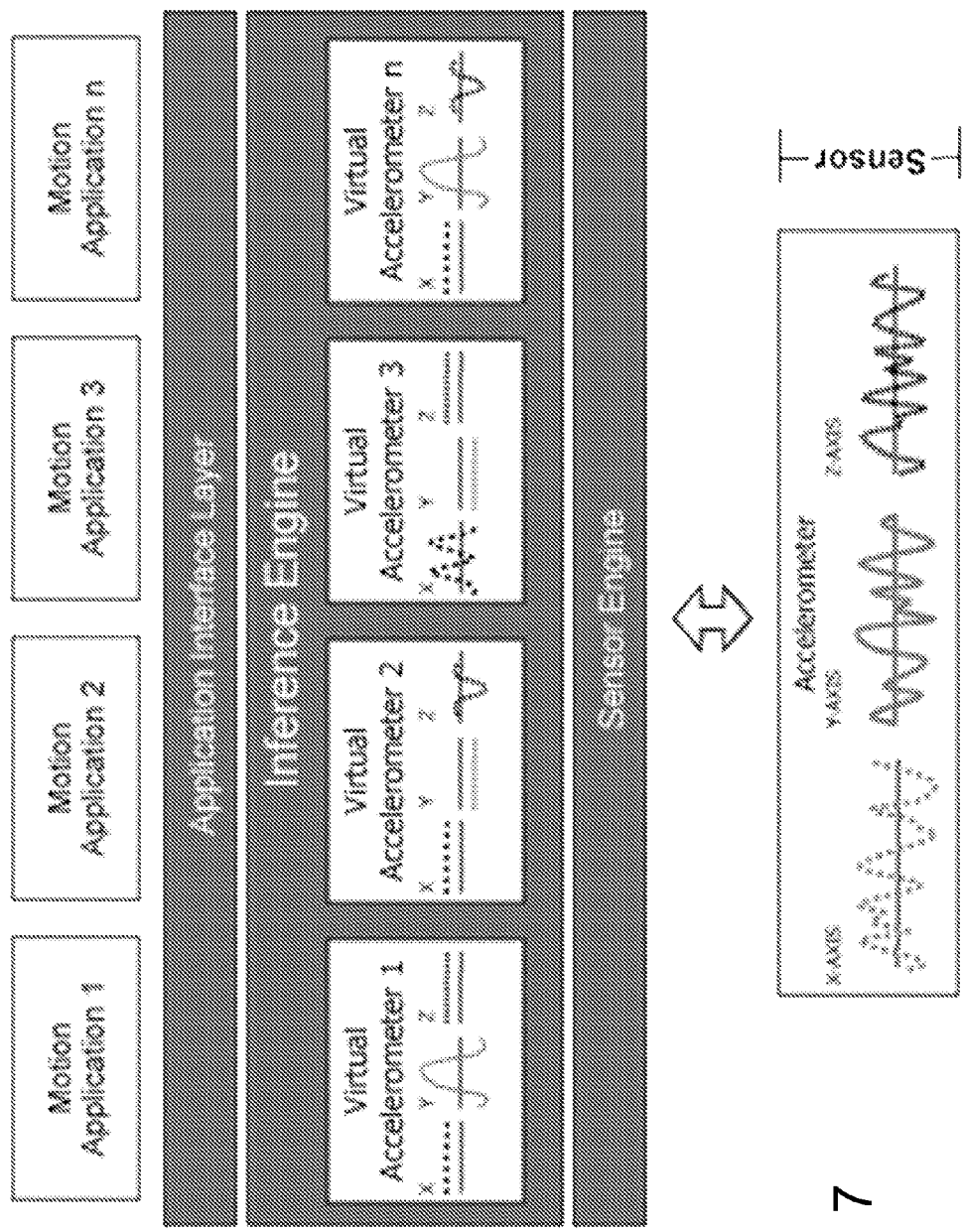
FIG. 7 is a block diagram of one embodiment of the device architecture which may be used with the present invention.

FIG. 7 is a block diagram of one embodiment of the device architecture which may be used with the present invention. FIG. 7 illustrates the inference engine for resolving the raw accelerometer data from the actual sensor into organized, actionable virtual accelerometers for each individual motion application currently operating on the device. The devices need not be aware that there is a virtual accelerometer between them and the actual accelerometer.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A virtual accelerometer receiving data from a real accelerometer, the virtual accelerometer comprising:
   an active process identifier engine to identify any active applications that may use accelerometer data;
   an Intelligent Signal Interpretation and Separation (ISIS) Engine to separate raw accelerometer data for each of the active applications that use accelerometer data; and
   a universal application program interface (API) to provide separated accelerometer data to an application.

2. The virtual accelerometer of claim 1, wherein the active process identifier engine is further to turn off the real accelerometer when no applications are using the accelerometer data.

3. The virtual accelerometer of claim 1, further comprising:
   a sample rate selector to select a sample rate for the real accelerometer based on the identified active applications.

4. The virtual accelerometer of claim 1, further comprising:
   an adjustment logic to remove an application from a list of active applications receiving accelerometer data, based on current activity levels.

5. The virtual accelerometer of claim 1, further comprising:
   an adjustment logic to adjust motion data used by the ISIS engine based on a current activity level of the user.

6. The virtual accelerometer of claim 1, further comprising:
   a registration logic to enable a user to register motion data for an application, the motion data used by the ISIS engine to identify a portion of the accelerometer data associated with the application.

7. The virtual accelerometer of claim 6, further comprising:
   the registration logic to utilize a set of sample motions by the user to set the motion data.

8. The virtual accelerometer of claim 6, further comprising:
   a calibration logic to calibrate sample motion data based on actual user motion.

* * * * *